United States Patent
Konno (10) Patent No.: US 6,613,265 B1
(45) Date of Patent: Sep. 2, 2003

(54) METHOD OF OPERATING A BACK-FLOW PREVENTION APPARATUS

(75) Inventor: Masaaki Konno, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 267 days.

(21) Appl. No.: 09/693,955

(22) Filed: Oct. 23, 2000

(30) Foreign Application Priority Data

Nov. 12, 1999 (JP) .............................. 11-322375

(51) Int. Cl.[7] .......................... B29C 45/52; B29C 45/60
(52) U.S. Cl. ................. 264/328.1; 264/328.17
(58) Field of Search .............. 264/328.17, 328.1; 425/557, 561, 159

(56) References Cited

U.S. PATENT DOCUMENTS

| 4,105,147 A | | 8/1978 | Stubbe |
| 5,002,717 A | | 3/1991 | Taniguchi |
| 5,112,213 A | | 5/1992 | Oas |
| 5,925,295 A | * | 7/1999 | Nakamura et al. .......... 264/40.1 |
| 6,007,322 A | * | 12/1999 | Suumen et al. ............. 425/557 |

FOREIGN PATENT DOCUMENTS

| DE | 29 42 320 A1 | 5/1981 |
| EP | 0 893 227 A1 | 1/1999 |
| JP | 5-147086 | 6/1993 |

OTHER PUBLICATIONS

Abstract of Japanese Patent Publ. No. 03045325; dated Feb. 26, 1991.
Abstract of Japanese Patent Publ. No. 09174629; dated Jul. 8, 1997.
Abstract of Japanese Patent Publ. No. 06190879; dated Jul. 12, 1994.

* cited by examiner

Primary Examiner—Jill L. Heitbrink
Assistant Examiner—Monica A Fontaine
(74) Attorney, Agent, or Firm—Squire, Sanders & Dempsey L.L.P.

(57) ABSTRACT

A back-flow prevention apparatus includes a screw body; a screw head attached to the screw body; a first resin passage formed on a first ring; a second resin passage formed on a second ring located adjacent to and rotatable relative to the first ring; a drive unit for rotating a screw; and a controller. A rotation restriction mechanism is disposed between the first and second rings such that communication is established between the first and second resin passages or sealing is effected upon rotation of the screw. The controller includes a resin-pressure reduction unit for reducing the pressure of resin in the space located forward of the screw head after completion of a metering step but before initiation of sealing. Since the pressure of resin in the space located forward of the screw head has been reduced when sealing is effected upon rotation of the screw, the resin in the space located forward of the screw head is prevented from flowing in the opposite rotational direction upon rotation of the screw.

6 Claims, 10 Drawing Sheets

| STEPS | CHANGEOVER VALVE 151 | CHANGEOVER VALVE 155 | CHANGEOVER VALVE 152 | CHANGEOVER VALVE 156 | OPEN/CLOSE VALVE 153 |
|---|---|---|---|---|---|
| INJECTION | A | B | A | A | B |
| METERING | C | B | A | A | B |
| DELAY | B | B | A | B | A |
| SEALING | C | B | B | B | A |
| SACK-BACK | B | A | A | B | A |

METHOD OF OPERATING A BACK-FLOW PREVENTION APPARATUS

BACKGROUND OF THE INVENTION

1. Field of the Invention

The present invention relates to a back-flow prevention apparatus and to a method of operating an injection apparatus.

2. Description of the Related Art

Conventionally, an injection molding machine has an injection unit. The injection unit has a heating cylinder in which a screw is disposed to be rotatable and to be movable in an advancement/retraction direction. Drive means rotates and advances or retreats the screw. In a metering step, the screw is rotated in one direction or in the forward direction, thereby melting resin supplied from a hopper and accumulating resin melt in a space located forward of the screw head. In an injection step, the screw is advanced so as to inject the resin melt from the space located forward of the screw head via an injection nozzle.

Figure 1:
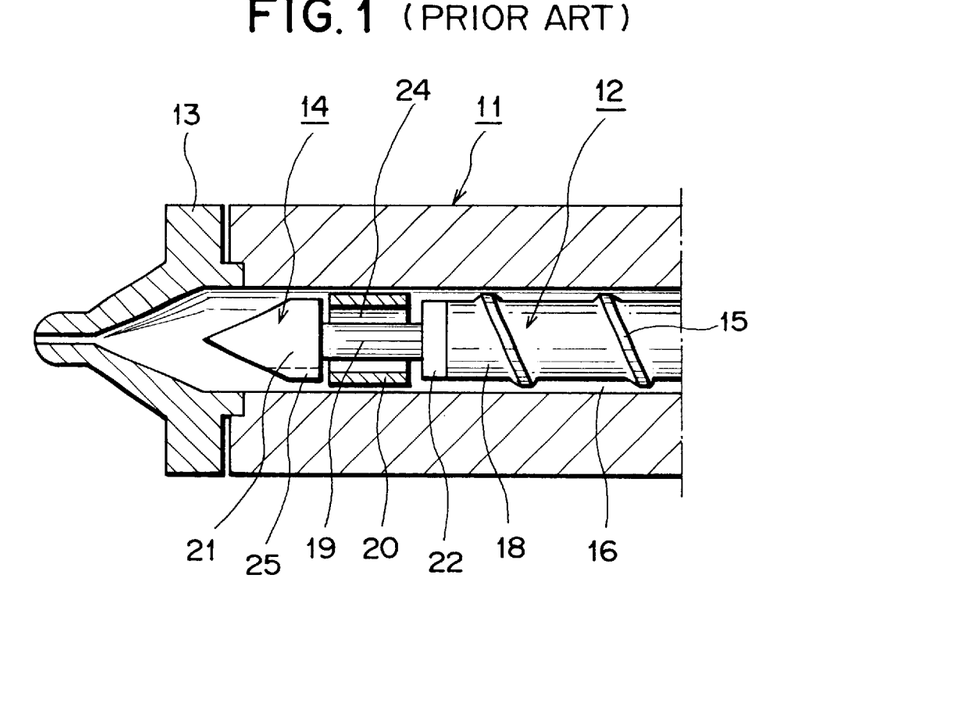
FIG. 1 is a sectional view of a main portion of a conventional injection unit.

FIG. 1 shows a sectional view of a main portion of a conventional injection unit.

In FIG. 1, reference numeral 11 denotes a heating cylinder. The heating cylinder 11 has an injection nozzle 13 at its front end (left-hand end in FIG. 1). In the heating cylinder 11, a screw 12 is disposed to be rotatable and to be movable in an advancement/retraction direction (left/right direction in FIG. 1). Unillustrated drive means rotates and advances or retreats the screw 12. Notably, an injection cylinder, a motor, or a like device serves as the drive means.

The screw 12 extends rearward (to the right in FIG. 1) within the heating cylinder 11. The screw 12 is connected at its rear end to the drive means and has a screw head 14 at its front end. A spiral flight 15 is formed on the surface of a metering portion 18 of the screw 12 to thereby form a groove 16 along the flight 15.

An unillustrated hopper is disposed at a predetermined position located at a rear portion of the heating cylinder 11. Resin pellets are charged into the hopper.

In the thus-configured injection unit, when the screw 12 is rotated in a forward direction through drive of the drive means in a metering step, resin pellets contained in the hopper drop into the heating cylinder 11 and are advanced (to the left in FIG. 1) through the groove 16. At the same time, the screw 12 is retreated (is moved to the right in FIG. 1).

An unillustrated heater is disposed around the outer circumference of the heating cylinder 11. The heater heats the heating cylinder 11 so as to melt resin pellets contained in the groove 16. Accordingly, when the screw 12 is retreated by a predetermined amount, a predetermined amount of resin melt for a single shot is accumulated in a space located forward of the screw head 14.

Upon completion of the metering step, suck-back is performed; i.e., the screw 12 is slightly retreated without being rotated, to thereby prevent the resin from oozing from the front end of the injection nozzle 13.

Next, in an injection step, the drive means is activated so as to advance the screw 12. The resin accumulated in the space located forward of the screw head 14 is injected from the injection nozzle 13 and charged into the cavity of an unillustrated mold apparatus, thereby filling the cavity with the resin.

In order to prevent backflow of the resin accumulated in the space located forward of the screw head 14 in the injection step, a back-flow prevention apparatus is disposed.

Specifically, the screw head 14 has a conical head body portion 21 formed at its front section (at the left portion in FIG. 1) and a small-diameter portion 19 formed at its rear section (at the right portion in FIG. 1). An annular back-flow prevention ring 20 is disposed around the circumference of the small-diameter portion 19, thereby defining a resin passageway 24 between the small-diameter portion 19 and the back-flow prevention ring 20. A seal ring 22 is disposed at the front end of the metering portion 13 such that the seal ring 22 can contact or separate from the rear end of the back-flow prevention ring 20. Moreover, a cut 25 extending in the axial direction is formed at a plurality of locations on the circumference of the head body portion 21.

Accordingly, when the screw 12 is advanced in the injection step, the resin accumulated in the space located forward of the screw head 14 is urged to move rearward. However, resin pressure causes the back-flow prevention ring 20 to move rearward with respect to the screw 12. Thus, the rear end of the back-flow prevention ring 20 abuts the seal ring 22, so that the communication between the spaces located on the front and rear sides of the seal ring 22 is broken to effect sealing. As a result, the resin accumulated in the space located forward of the screw head 14 is prevented from flowing rearward.

In contrast, when the screw 12 is rotated in the forward direction in the metering step, the screw 12 is retreated. However, due to pressure of the resin, the back-flow prevention ring 20 moves forward with respect to the screw 12. Thus, the front end of the back-flow prevention ring 20 abuts the rear end of the head body portion 21, so that the communication between the spaces located on the front and rear sides of the seal ring 22 is established. At this time, resin moves forward, while passing through the cuts 25, so that resin flow is not hindered.

However, in the injection apparatus, the amount of resin accumulated in the space located forward of the screw head 14 changes during the suck-back operation, because resin at the metering portion 18 moves to the space located forward of the screw head 14 upon performance of the suck-back operation.

Further, since sealing is effected through an operation of advancing the screw 12 to thereby move the back-flow prevention ring 20 rearward, the timing of completion of the sealing operation varies depending on the state of kneading and dispersion of resin, resin viscosity, resin temperature, and the rate at which the screw speed is increased at the time of starting the injection step. Thus, the amount of resin that flows back varies.

Accordingly, even when the injection stroke of the screw 12 for each shot is accurately controlled, the amount of injected resin varies. Further, when the amount of resin that moves during the suck-back operation is excessively small or the timing of completion of the sealing operation is delayed excessively, molded products suffer short shot or like defects. When the amount of resin that moves during the suck-back operation is excessively large or the timing of completion of the sealing operation is advanced excessively, molded products suffer burrs or like defects.

In order to solve the above-described problem, there has been proposed a back-flow prevention apparatus which includes first and second rings disposed on the rear side of the screw head. When the screw is rotated forward, first and second resin passages formed in the first and second rings, respectively, communicate with each other, and when the screw is rotated in the opposite direction; i.e., rotated in reverse, the communication between the first and second resin passages is broken to thereby effect sealing.

In this case, effecting sealing before performance of the suck-back operation prevents resin from moving from the metering portion to the space located forward of the screw head. Therefore, the amount of resin accumulated in the space located forward of the screw head can be stabilized.

Further, since sealing can be effected without advancement of the screw, the timing of effecting the sealing can be stabilized.

However, the conventional back-flow prevention apparatus has a problem such that in some cases the communication between the first and second resin passages cannot be broken through reverse rotation of the screw, resulting in failure to effect sealing.

In such a case, resin accumulated in the space located forward of the screw head flows back during the injection step, with the result that a proper amount of resin necessary for providing a cushion effect cannot be secured. Accordingly, the amount of resin charged into the cavity of a mold apparatus becomes insufficient, so that molded products suffer defects.

SUMMARY OF THE INVENTION

An object of the present invention is to solve the above-mentioned problems in the conventional back-flow prevention apparatus and to provide a back-flow prevention apparatus and a method of operating an injection apparatus, which apparatus and method can prevent resin from moving due to suck-back and can effect reliable sealing.

To achieve the above object, a back-flow prevention apparatus of the present invention comprises: a screw body; a screw head attached to the screw body; a first resin passage formed on a first ring disposed between the screw body and the screw head; a second resin passage formed on a second ring disposed between the screw body and the screw head to be located adjacent to and be rotatable relative to the first ring; drive means for rotating a screw selectively in one direction and the opposite direction; and a controller.

Rotation restriction means is disposed between the first and second rings such that communication between the first and second resin passages is established when the screw is rotated in one direction, and the communication between the first and second resin passages is broken when the screw is rotated in the opposite direction, to thereby effect sealing.

The controller includes resin-pressure reduction means for reducing the pressure of resin in the space located forward of the screw head after completion of a metering step but before initiation of sealing.

In this case, when the screw is rotated in one direction in the metering step, communication between the first and second resin passages is established, so that resin moves forward from the metering portion that constitutes the screw body via the first and second resin passages and is accumulated in the space located forward of the screw head. Upon completion of the metering step, the pressure of resin in the space located forward of the screw head is reduced by the action of the resin-pressure reduction means.

Subsequently, the screw is rotated in the opposite direction to thereby effect sealing. At this time, the pressure of resin in the space located forward of the screw head has been decreased. Therefore, resin located forward of the screw head is prevented from flowing in the reverse rotation direction with rotation of the screw.

Accordingly, the second ring is not rotated simultaneously with the first ring, so that the communication between the first and second resin passages is broken reliably in order to effect reliable sealing.

Further: a proper amount of resin necessary for providing a cushion effect can be secured, so that a sufficient amount of resin can be injected. Therefore, the amount of resin charged into the cavity of a mold apparatus never becomes insufficient, so that molded products do not suffer defects such as short shot.

Another back-flow prevention apparatus of the present invention comprises: a screw body; a screw head attached to the screw body; a first resin passage formed on a ring disposed between the screw body and the screw head; a second resin passage formed on the screw head; drive means for rotating a screw selectively in one direction and the opposite direction; and a controller.

Rotation restriction means is disposed between the ring and the screw head such that communication between the first and second resin passages is established when the screw is rotated in one direction, and the communication between the first and second resin passages is broken when the screw is rotated in the opposite direction, to thereby effect sealing.

The controller includes resin-pressure reduction means for reducing the pressure of resin in the space located forward of the screw head after completion of a metering step but before initiation of sealing.

In this case, since disposition of only a single ring is required, the cost of the injection apparatus can be reduced.

In still another back-flow prevention apparatus of the present invention, the drive means rotates the screw in one direction in the metering step, rotates the screw in the opposite direction after completion of the metering step, and holds the screw at a metering-step completion position during the period in which the screw is rotated in the opposite direction.

In this case, since suck-back operation is always effected and an injection step is initiated at the metering-step completion position, variations in the amount of resin injected for each shot can be suppressed.

BRIEF DESCRIPTION OF THE DRAWINGS

The structure and features of the back-flow prevention apparatus and a method of operating an injection apparatus according to the present invention will be readily appreciated as the same becomes better understood by referring to the drawings, in which.

DESCRIPTION OF THE PREFERRED EMBODIMENTS

Embodiments of the present invention will next be described in detail with reference to the drawings.

Figure 2:
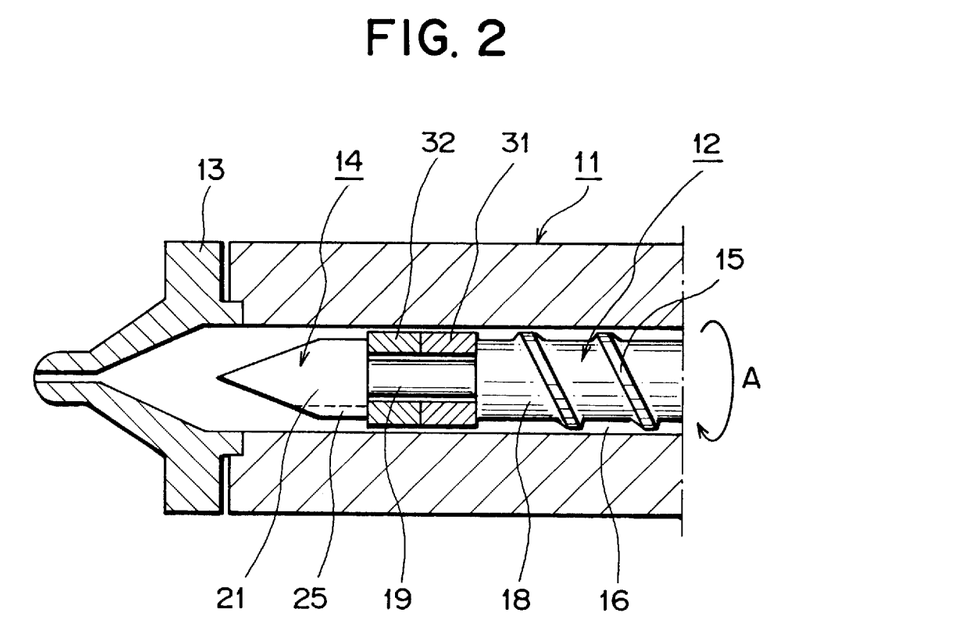
FIG. 2 is a sectional view of a main portion of an injection apparatus according to a first embodiment of the present invention.
Figure 3:
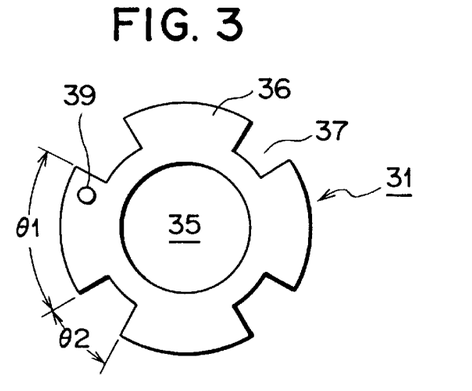
FIG. 3 is a front view of a first ring used in the first embodiment of the present invention.
Figure 4:
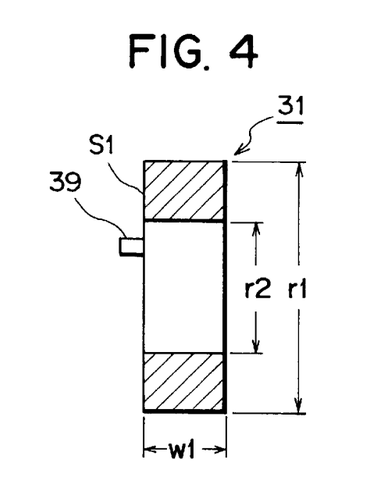
FIG. 4 is a sectional view of the first ring used in the first embodiment of the present invention.
Figure 5:
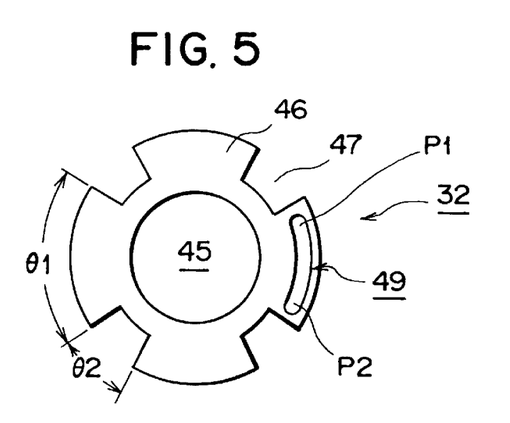
FIG. 5 is a rear view of a second ring used in the first embodiment of the present invention.
Figure 6:
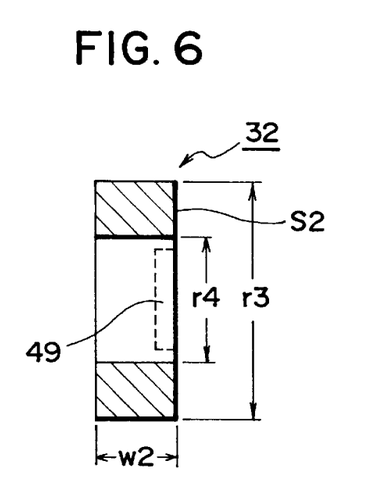
FIG. 6 is a sectional view of the second ring used in the first embodiment of the present invention.

FIG. 2 is a sectional view of a main portion of an injection apparatus according to a first embodiment of the present invention; FIG. 3 is a front view of a first ring used in the first embodiment of the present invention; FIG. 4 is a sectional view of the first ring used in the first embodiment of the present invention; FIG. 1 is a rear view of a second ring used in the first embodiment of the present invention; and FIG. 6 is a sectional view of the second ring used in the first embodiment of the present invention.

In FIG. 2, reference numeral 11 denotes a heating cylinder serving as a heating member. The heating cylinder 11 has an injection nozzle 13 at its front end (left-hand end in FIG. 2). In the heating cylinder 11, a screw 12 serving as an injection member is disposed such that the screw 12 is rotatable and can be advanced and retreated (moved in the left/right directions in FIG. 2). The screw 12 is rotated through drive of an unillustrated oil-driven motor (hereinafter called "oil motor") serving as first drive means, and is advanced and retreated through drive of an unillustrated injection cylinder serving as second drive means. Although in the present embodiment an oil motor and an injection cylinder are used as the first and second drive means, electric motors or other drive units may be used.

The screw 12 extends rearward (to the right in FIG. 2) within the heating cylinder 11. The screw 12 has a screw head 14 at its front end and is connected at its rear end to the oil motor and the injection cylinder. A spiral flight 15 is formed on the body of the screw 12; i.e., on the surface of a metering portion 18, which constitutes the screw body. Thus, a groove 16 is formed along the flight 15.

An unillustrated hopper is disposed at a predetermined position located at a rear portion of the heating cylinder 11. Resin pellets are charged into the hopper.

In the thus-configured injection apparatus, when the screw 12 is rotated in one direction (the direction of arrow A) or in the forward direction through drive of the oil motor in a metering step, resin pellets contained in the hopper drop into the heating cylinder 11 and are advanced (moved to the left in FIG. 2) through the groove 16. At the same time, the screw 12 is retreated (is moved to the right in FIG. 2).

An unillustrated heater is disposed around the outer circumference of the heating cylinder 11. The heater heats the heating cylinder 11 so as to melt resin pellets contained in the groove 16. Accordingly, when the screw 12 is retreated by a predetermined amount, a predetermined amount of resin melt for a single shot is accumulated in a space located forward of the screw head 14.

When the injection cylinder is activated to thereby advance the screw 12 in an injection step, the resin accumulated in the space located forward of the screw head 14 is injected from the injection nozzle 13 and is charged into the cavity of an unillustrated mold apparatus, thereby filling the cavity with the resin.

In order to prevent backflow of the resin accumulated in the space located forward of the screw head 14 in the injection step, a back-flow prevention apparatus is disposed.

Specifically, the screw head 14 has a conical head body portion 21 formed at its front section (at the left portion in FIG. 2) and a small-diameter portion 19 formed at its rear section (at the right portion in FIG. 2). The rear end of the small-diameter portion 19 is fixed to the metering portion 18 by means of screw-fastening. First and second annular rings 31 and 32 are disposed around the circumference of the small-diameter portion 19 such that the rings 31 and 32 are located adjacent to each other and are rotatable relative to the screw 12. Moreover, a cut 25 extending in the axial direction is formed at a plurality of locations on the circumference of the head body portion 21.

In this case, the thickness $w_1$, outside diameter $r_1$, and inside diameter $r_2$ of the first ring 31 and the thickness $w_2$, outside diameter $r_3$, and inside diameter $r_4$ of the second ring 32 are determined so as to satisfy the following relations.

$w_1 = w_2$
$r_1 = r_3$
$r_2 = r_4$

The thicknesses $w_1$ and $w_2$ may be set to satisfy the following relation.

$w_1 \neq w_2$

In order, to prevent the first and second rings 31 and 32 from rotating together with the screw head 14, the sum of the thickness $w_1$ and the thickness $w_2$ is rendered slightly smaller than the distance between the rear end of the head body portion 21 and the front end of the metering portion 18 such that a clearance of about 0.1 to 0.2 mm is formed between the rear end of the first ring 31 and the front end of the metering portion 18 or between the front end of the second ring 32 and the rear end of the head body portion 21. Notably, the first and second rings 31 and 32 do not move in the axial direction upon changeover between injection and metering.

In order to prevent the first and second rings 31 and 32 from rotating together with the screw head 14, the outside diameters $r_1$ and $r_3$ are set slightly smaller than the inside diameter of the heating cylinder 11, and the inside diameters $r_2$ and $r_4$ are set slightly greater than the outside diameter of the small-diameter portion 19.

The first ring 31 has a central opening 35, through which the small-diameter portion 19 passes. Further, the first ring 31 has lands 36 formed at a plurality of circumferential positions (four positions in the present embodiment) such that each land 36 extends over an angle θ1, and grooves 37 each formed between corresponding lands 36 such that each groove 37 extends over an angle θ2. The grooves 37 serve as a first resin passage. Further, a pin 39 is formed on a surface S1 of a predetermined land 36 facing the second ring 32 such that the pin 39 projects from one end of the surface S1.

The second ring 32 has a central opening 45, through which the small-diameter portion 19 passes. Further, the second ring 32 has lands 46 formed at a plurality of circumferential positions (four positions in the present embodiment) such that each land 46 extends over an angle θ1, and grooves 47 each formed between corresponding lands 46 such that each groove 47 extends over an angle θ2. The grooves 47 serve as a second resin passage. Further, an arcuate restriction groove 49 for receiving the pin 39 is formed on a surface S2 of a predetermined land 46 facing the first ring 31. The restriction groove 49 has a first restriction end P1 at one end and a second restriction end P2 at the opposite end.

The first and second rings 31 and 32 are set on the screw 12 such that the first and second rings 31 and 32 are located adjacent to each other with the surface S1 in contact with the surface S2 and the pin 39 is received by the restriction groove 49.

Therefore, the first and second rings 31 and 32 are rotatable relative to each other, and their relative rotation is restricted by rotation restriction means, which is constituted by the pin 39 and the restriction groove 49.

Next, operation of the back-flow prevention apparatus having the above-described structure will be described.

Figure 7:
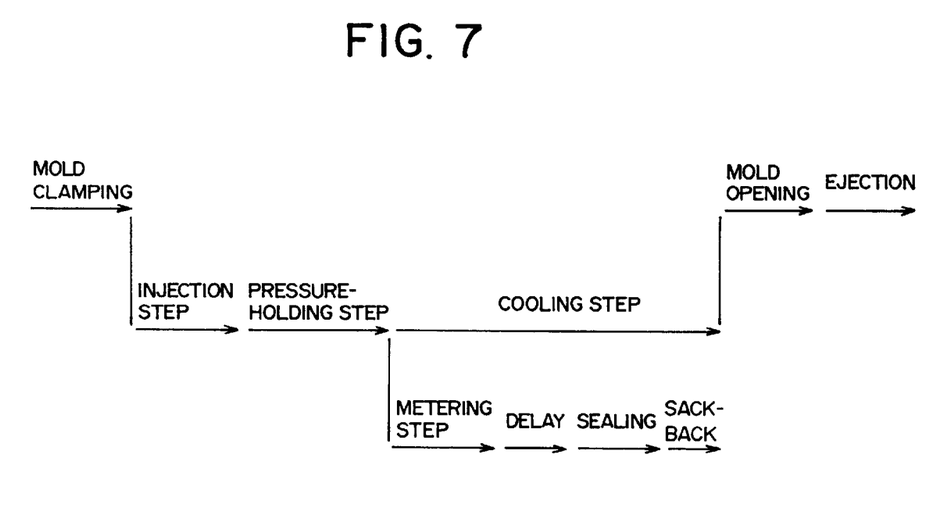
FIG. 7 is a time chart showing operation of the back-flow prevention apparatus according to the first embodiment of the present invention.
Figure 8:
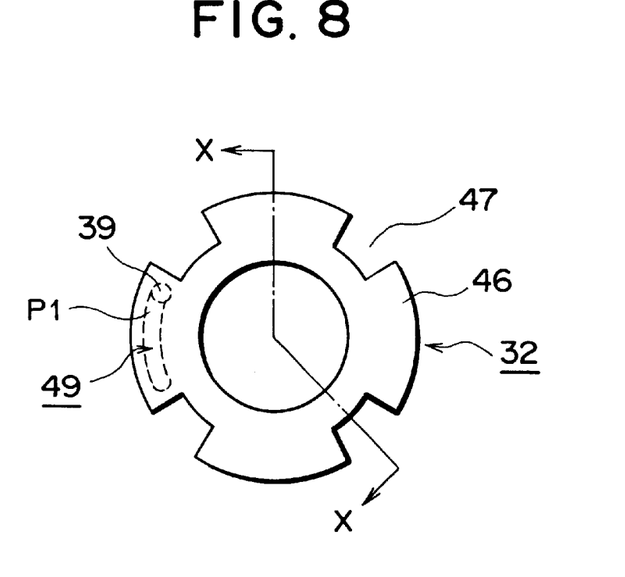
FIG. 8 is a front view of the first and second rings, showing the positional relationship between the first and second rings in a metering step.
Figure 9:
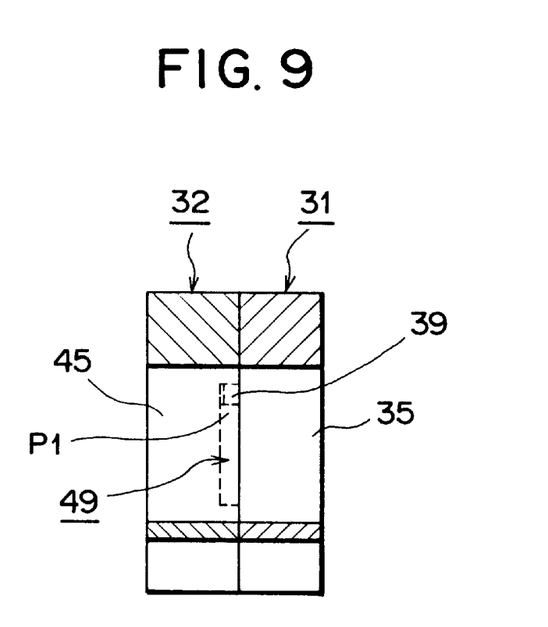
FIG. 9 is a sectional view taken along line X—X in FIG. 8.
Figure 10:
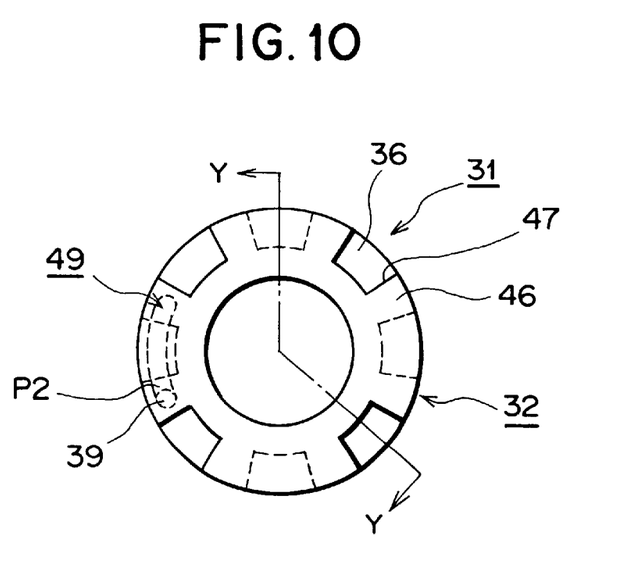
FIG. 10 is a front view of the first and second rings, showing the positional relationship between the first and second rings in an injection step.
Figure 11:
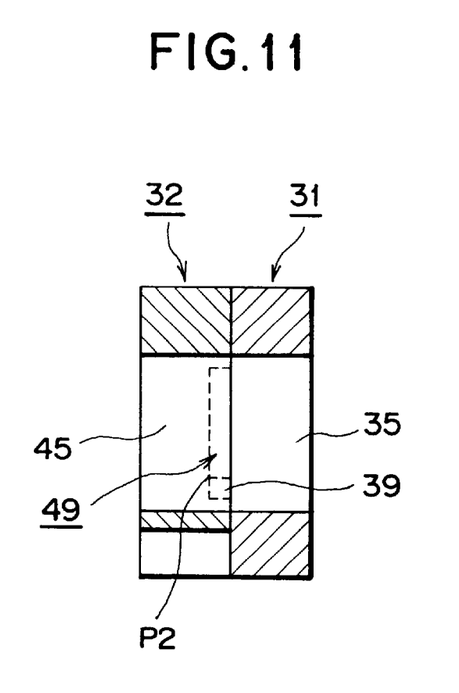
FIG. 11 is a sectional view taken along line Y—Y in FIG. 10.

FIG. 7 is a time chart showing operation of the back-flow prevention apparatus according to the first embodiment of the present invention; FIG. 8 is a front view of the first and second rings, showing the positional relationship between the first and second rings in a metering step; FIG. 9 is a sectional view taken along line X—X in FIG. 8; FIG. 10 is a front view of the first and second rings, showing the positional relationship between the first and second rings in an injection step; and FIG. 11 is a sectional view taken along line Y—Y in FIG. 10.

When, in a metering step, the oil motor is driven by metering control means of an unillustrated controller to thereby rotate the screw 12 (FIG. 2) forward, the first ring 31 is rotated clockwise in FIG. 3 by means of frictional force generated between the first ring 31 and the screw 12 and flow of resin generated upon rotation of the screw 12. Subsequently, the second ring 32 is rotated in the same direction as the first ring 31 (counterclockwise in FIG. 5), by means of frictional force generated between the second ring 32 and the first ring 31 and flow of resin generated upon rotation of the first ring 31.

At this point in time, the first and second rings 31 and 32 are in a state such that they are pressed against the front end surface of the metering portion 18 by means of pressure of resin accumulated in the space located forward of the screw head 14. Therefore, the first ring 31 is first rotated with the result that a relative rotation is produced between the first and second rings 31 and 32. However, when the pin 39 comes into contact with the first restriction end P1 of the restriction groove 49, the first and second rings 31 and 32 are rotated together clockwise in FIG. 8.

As a result, each groove 37 (FIG. 3) of the first ring 31 and the corresponding groove 47 (FIG. 5) of the second ring 32 are positioned at the same circumferential position so that they communicate with each other. Therefore, upon the forward rotation of the screw 12, resin moves forward from the metering portion 18 via the grooves 37 and 47 and is accumulated in the space located forward of the screw head 14. Since the cuts are formed in the head body portion 21 at a plurality of circumferential positions, the movement of the resin is not hindered.

After a predetermined delay time has elapsed following completion of the metering step, a sealing operation is performed. That is, through drive of the oil motor in the reverse direction, the screw 12 is rotated in the opposite direction or rotated in reverse at a rotational speed N (rpm) for a period t.

Consequently, the first ring 31 is rotated counterclockwise in FIG. 3 by means of frictional force generated between the first ring 31 and the screw 12 and flow of resin generated upon reverse rotation of the screw 12. Subsequently, the second ring 32 is rotated in the same direction as the first ring 31 (clockwise in FIG. 5), by means of frictional force generated between the second ring 32 and the first ring 31 and flow of resin generated upon rotation of the first ring 31.

At this point in time, similar to the above-described case, the first and second rings 31 and 32 are in a state such that they are pressed against the front end surface of the metering portion 18 by means of pressure of resin accumulated in the space located forward of the screw head 14. Therefore, the first ring 31 is rotated first, with the result that a relative rotation is produced between the first and second rings 31 and 32. However, when the pin 39 comes into contact with the second restriction end P2 of the restriction groove 49, the first and second rings 31 and 32 are rotated together counterclockwise in FIG. 10.

As a result, each groove 37 and the corresponding groove 47 are positioned at different circumferential positions so that the communication between the spaces located on the front and rear sides of the first and second rings 31 and 32, respectively, is broken so as to effect sealing.

When the screw 12 is rotated in reverse, the screw 12 is apt to advance due to a screw effect. In order to prevent this undesirable advancement, the controller drives the injection cylinder in order to maintain the screw 12 at a position where the metering step has been completed, or a metering-step completion position.

Notably, during the metering step, the oil motor is caused to apply a back-pressure to the screw 12. When the back-pressure is high, the resin accumulated in the space located forward of the screw head 14 produces a high pressure accordingly, and the high pressure is maintained even immediately after completion of the metering step. Therefore, the second ring 32 is pressed against the first ring 31 with a large force.

In such a case, when, for effecting the above-described sealing, the oil motor is driven immediately after completion of the metering step in order to rotate the screw 12 in reverse and to thereby rotate the first ring 31 first, the resin located forward of the screw head 14 is caused to flow in the reverse rotation direction, so that the second ring 32 is rotated substantially simultaneously with the first ring 31.

In order to prevent rotation of the second ring 32, which would otherwise occur upon rotation of the screw 12, as described above, the sealing is performed when a delay period has elapsed after completion of the metering step. For such an operation, delay-time setting control means of the controller serving as resin-pressure reduction means starts clocking by use of an unillustrated timer on completion of the metering step. When a preset delay time has elapsed, sealing control means of the controller drives the oil motor in order to start the sealing. In the present embodiment, the delay time is varied depending on the size of molded products and type of resin to be used and is not, shorter than 0.2 sec, preferably not shorter than 0.5 sec. The metering is performed during a cooling stage, and the time required to cool a molded product is determined on the basis of the type of the product. Therefore, the time required to cool a molded product, minus the time required to complete metering, sealing, and suck-back, can be used as the delay time.

Since the communication between the spaces located on the front and rear sides of the first and second rings 31 and 32, respectively, is established via the grooves 37 and 47 upon completion of the metering step, when the start of the sealing is delayed, the pressure of resin located on the front side of the first and second rings 31 and 32 and the pressure of resin located on the rear side of the first and second rings 31 and 32 are equalized, so that the pressure of resin in the space located forward of the screw head 14 decreases.

Accordingly, when the first ring 31 is rotated earlier, resin located forward of the screw head 14 is prevented from flowing In the reverse rotation direction upon rotation of the screw 12, with the result that the second ring 32 is not rotated simultaneously with the first ring 31. Thus, the communication between the grooves 37 and 47 is broken reliably in order to effect reliable sealing. Notably, as the delay time is increased, the pressure of resin located forward of the screw head 14 decreases and becomes stable.

Suck-back control means of the controller drives the injection cylinder in order to retreat the screw 12 over a predetermined distance without rotation, to thereby effect suck-back. Therefore, the pressure of resin located forward of the screw head 14 is decreased further in order to prevent resin from running from the front end of the injection nozzle 13.

Since communication is not established between the grooves 37 and 47 during the suck-back operation, even when the screw 12 is retreated, resin within the metering portion 18 does not move to the space located forward of the screw head 14. Accordingly, variations in the amount of resin accumulated in the space located forward of the screw head 14 are prevented.

Subsequently, injection control means of the controller drives the injection cylinder in order to advance the screw 12 in the injection step. Consequently, the resin accumulated in the space located forward of the screw head 14 is injected from the injection nozzle 13 and charged into the cavity of an unillustrated mold apparatus.

At this point in time, the resin accumulated in the space located forward of the screw head 14 is apt to flow in reverse or backward. However, since the first and second rings 31 and 32 are in the same states as those during the suck-back operation and communication is not established between the grooves 37 and 47, the resin accumulated in the space located forward of the screw head 14 does not flow in reverse or backward.

Since reliable sealing is effected before start of an injection step, a proper amount of resin necessary for providing a cushion effect can be secured, so that a sufficient amount of resin can be injected. Therefore, the amount of resin charged into the cavity never becomes insufficient, so that molded products do not suffer defects such as short shot.

Since the sealing is effected through rotation of the screw 12, resin does not move through the grooves 37 and 47 during the sealing operation. In addition, since the sealing operation is performed with the screw 12 being maintained at a metering-step completion position, the suck-back operation is always effected and the injection step is initiated at the metering-step completion position. Therefore, variations in the amount of resin injected for each shot can be suppressed in order to stabilize the charge amount, so that molded products do not suffer defects such as short shot or burrs.

Moreover, in the injection step, resin can be fed into the cavity simultaneously with commencement of advance movement of the screw 12. Therefore, the response in transmitting injection force to the melt front can be improved.

Furthermore, the timing of completion of the sealing operation does not vary with the state of kneading and dispersion of resin, resin viscosity, resin temperature, and the rate at which the screw speed is increased at the time of starting the injection step.

In the present embodiment, the back-flow prevention apparatus is operated in accordance with the time chart shown in FIG. 7.

That is, after completion of clamping performed by an unillustrated mold clamping apparatus, an injection step is started, upon completion of which a pressure-holding step is performed for a predetermined period of time. In the mold apparatus, a cooling step is started, during which the injection apparatus performs metering, delaying, sealing, and suck-back. When the cooling step is ended in the mold apparatus, the mold clamping apparatus effects mold opening and ejection.

Next, drive means for the screw 12 will be described.

Figure 12:
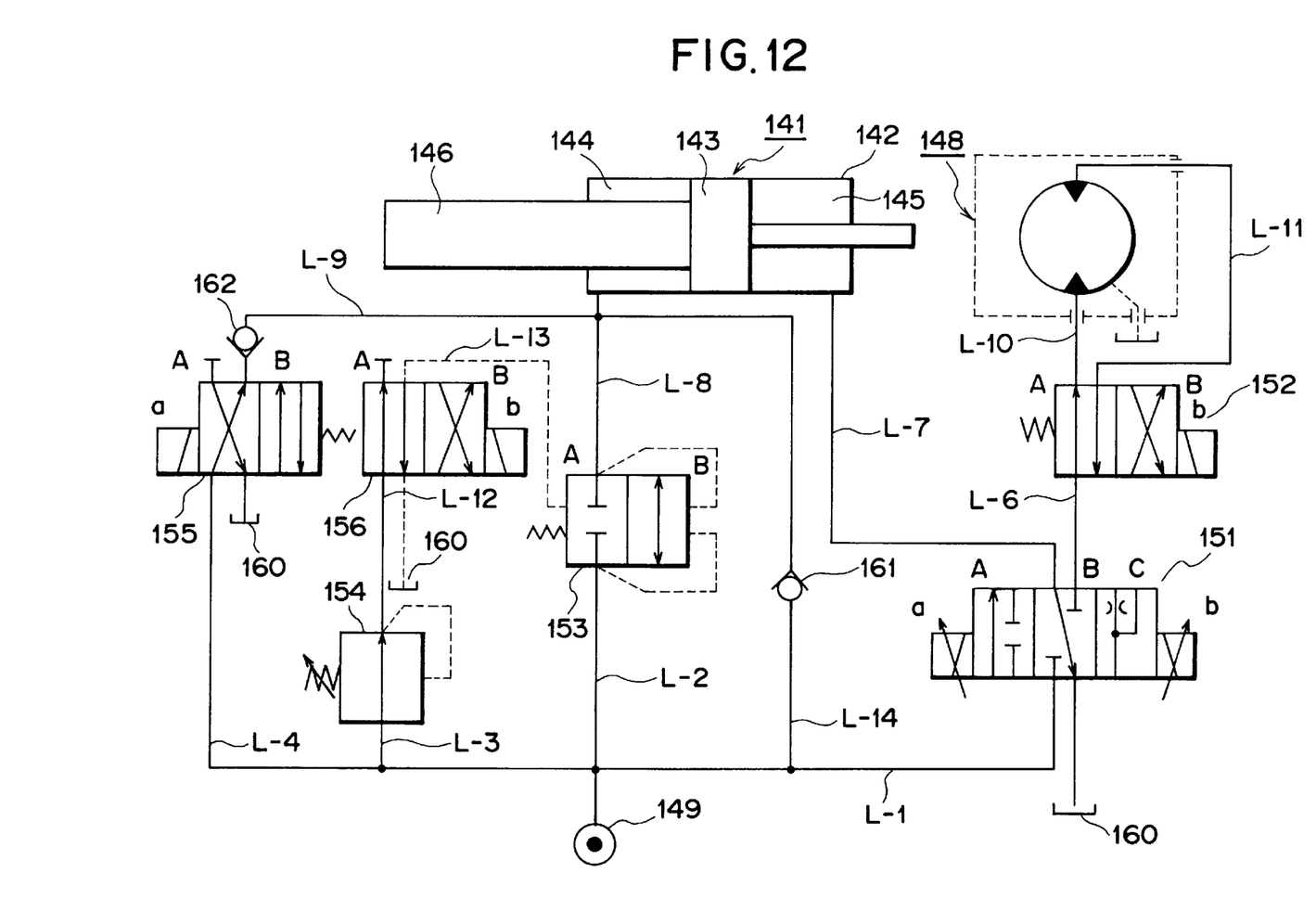
FIG. 12 is a hydraulic circuit of drive means used in the first embodiment of the present invention.
Figure 13:
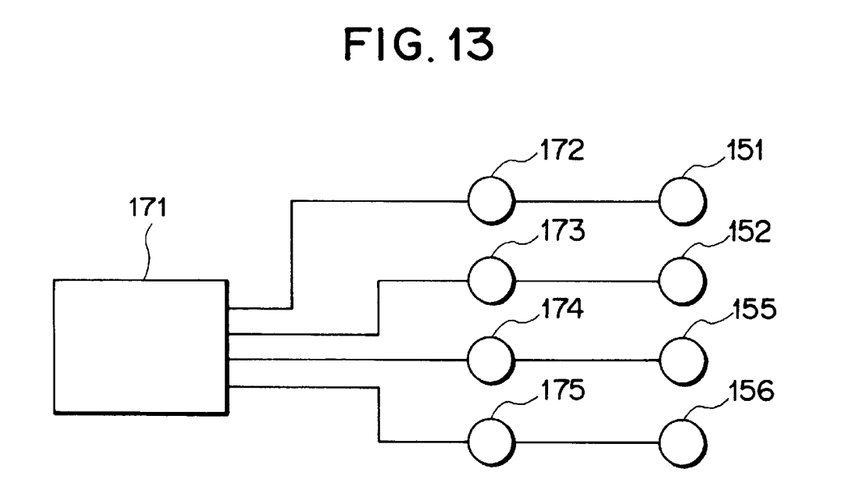
FIG. 13 is a block diagram of a controller for controlling the hydraulic circuit shown in FIG. 12.
Figure 14:
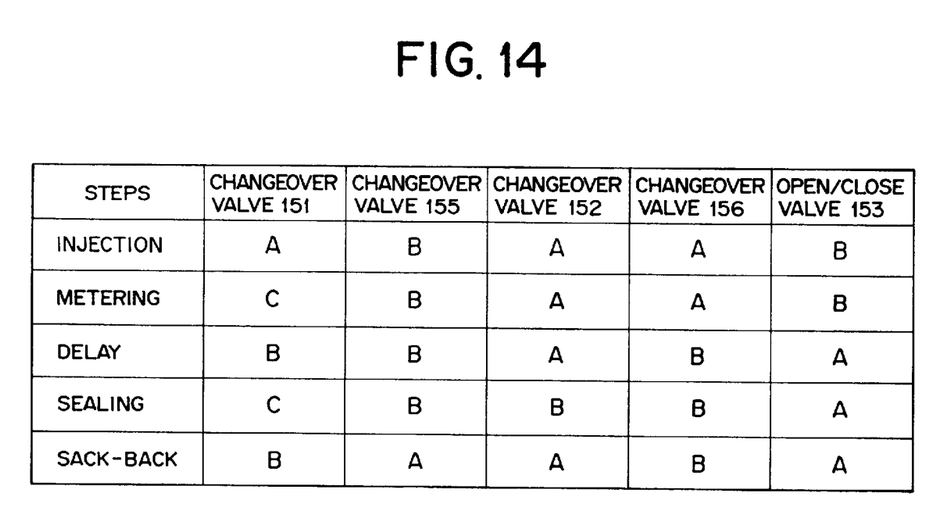
FIG. 14 is a table showing changes in operation position of drive means in the first embodiment of the present invention.

FIG. 12 is a hydraulic circuit of drive means used in the first embodiment of the present invention; FIG. 13 is a block diagram of a controller for controlling the hydraulic circuit shown in FIG. 12; and FIG. 14 is a table showing changes in operation position of drive means in the first embodiment of the present invention.

In FIG. 12, reference numeral 141 denotes an injection cylinder for advancing and retreating the screw 12 (FIG. 2) in the injection step. The injection cylinder 141 consists of a cylinder body 142 and a piston 143, which is disposed inside the cylinder body 142 to be advanced and retreated (moved in the left/right directions in FIG. 12). A piston rod 146 projecting from the front end of the piston 143 (on the left side in FIG. 12) is connected to the screw 12. The piston 143 defines a first oil chamber 144 on its front side and a second oil chamber 145 on its rear side (on the right side in FIG. 12). Therefore, the piston 143 can be retreated (moved rightward in FIG. 12) through supply of oil to the first oil chamber 144 and draining of oil from the second oil chamber 145, and can be advanced (moved leftward in FIG. 12) through supply of oil to the second oil chamber 145 and draining of oil from the first oil chamber 144.

Reference numeral 148 denotes an oil motor for rotating the screw 12 forward and backward. In the metering step, the screw 12 can be rotated forward through drive of the oil motor 148 in the forward direction, and during the period between completion of the metering step and initiation of the injection step, the screw 12 can be rotated in reverse through drive of the oil motor 148 in the reverse direction.

Reference numeral 149 denotes an oil pressure source. The oil pressure source 149 is connected to a changeover valve 151 via an oil passage L-1, to an open/close valve 153 via an oil passage L-2, to a pressure reduction valve 154 via an oil passage L-3, and to a changeover valve 155 via an oil passage L-4.

The changeover valve 151 is connected to a changeover valve 152 via an oil passage L-6 and to the second oil chamber 145 via an oil passage L-7.

The changeover valve 153 is connected to the first oil chamber 144 via an oil passage L-8. The changeover valve 155 is connected to the first oil chamber 144 via an oil passage L-9. A check valve 162 is disposed in the oil passage L-9.

The changeover valve 152 is connected to the oil motor 148 via oil passages L-10 and L-11. The pressure reduction valve 154 is connected to a changeover valve 156 via an oil passage L-12. The changeover valve 156 is connected to the open/close valve 153 via a pilot oil passage L-13. The oil pressure source 149 is connected to the first oil chamber 144 via an oil passage L-14, in which a check valve 161 is disposed.

The changeover valve 151 has solenoids a and b. The changeover valve 151 assumes position A when the solenoid a is turned on and the solenoid b is turned off, assumes position B when the solenoids a and b are turned on, and assumes position C when the solenoid a is turned off and the solenoid b is turned on. In position A, communication between the oil passages L-1 and L-7 is established, so that oil from the oil pressure source 149 is supplied to the second oil chamber 145. At this time, communication between the oil passage L-6 and an oil tank 160 is broken. In position B, communication between the oil passage L-7 and the oil tank 160 is established, so that oil is drained from the second chamber 145. In position C, communication between the oil passage L-1 and the oil passage L-6 and communication between the oil passage L-1 and the oil passage L-7 are established.

The changeover valve 152 has a solenoid b. The changeover valve 152 assumes position A when the solenoid b is turned off, and assumes position B when the solenoid b is turned on. In position A, communication between the oil passages L-6 and L-10 is established, so that the oil motor 148 is driven in the forward direction. In position B, communication between the oil passages L-6 and L-11 is established, so that the oil motor 148 is driven in the reverse direction.

The changeover valve 156 has a solenoid b. The changeover valve 156 assumes position A when the solenoid b is turned off, and assumes position B when the solenoid b is turned on. In position A, communication between the pilot oil passage L-13 and the oil tank 160 is established, so that application of a pilot pressure to the open/close valve 153 is stopped. In position B, communication between the oil passage L-12 and the pilot oil passage L-13 is established, so that the pilot pressure is applied to the open/close valve 153.

The open/close valve 153 assumes position A when the pilot pressure is applied thereto via the pilot oil passage L-13, and assumes position B when the pilot pressure is not applied thereto. In position A, communication between the oil passages L-2 and L-8 is broken. In position B, communication between the oil passages L-2 and L-8 is established, so that oil from the oil pressure source 149 is supplied to the first oil chamber, 144.

The changeover valve 155 has a solenoid a. The changeover valve 155 assumes position A when the solenoid a is turned on, and assumes position B when the solenoid a is turned off. In position A, communication between the oil passages L-4 and L-9 is established, so that oil from the oil pressure source 149 is supplied to the first oil chamber 144. In position B, communication between the oil passage L-9 and the oil tank 160 is established, so that oil is drained from the first oil chamber 144.

Next, operation of the respective changeover valves 151, 152, 155, and 156 will be described.

In FIG. 13, reference numeral 171 denotes a controller, and drivers 172 to 175 are disposed between the controller 171 and the respective changeover valves 151, 152, 155, and 156. The driver 172 turns on and off the solenoids a and b of the changeover valve 151; the driver 173 turns on and off the solenoid b of the changeover valve 152; the driver 174 turns on and off the solenoid a of the changeover valve 155; and the driver, 175 turns on and off the solenoid b of the changeover valve 156.

As shown in FIG. 14, in the metering step, the changeover valve 151 is placed in position C, and the changeover valve 152 in position A. Further, the changeover valve 156 is placed in position A, so that the open/close valve 153 is placed in position B. As a result, the oil motor 148 is driven in the forward direction so as to rotate the screw 12 forward. Notably, +he changeover valve 155 is placed in position B at this time.

After completion of the metering step, the changeover valve 151 is placed in position B, and the changeover valve 152 remains in position A, until the above-mentioned delay time elapses. Further, the changeover valve 156 is placed in position B, so that a pilot pressure is applied to the open/close valve 153, which is thus placed in position A. As a result, the oil motor 148 and the injection cylinder 141 are stopped. Notably, the changeover valve 155 remains in position B at this time.

When the above-mentioned delay time has elapsed, the changeover valve 151 is placed in position C, and the changeover valve 152 in position B. Further, the changeover valve 156 remains in position B, so that a pilot pressure is applied to the open/close valve 153, which thus remains in position A. As a result, the screw 12 is rotated in reverse, so that sealing is effected by the back-flow prevention apparatus. Notably, the changeover valve 155 remains in position B at this time.

At this time, the screw 12 is apt to advance. However, since oil remains on the suck-back side of the injection cylinder 141; i.e., in the first oil chamber 144, the screw 12 is not moved and is held at a metering-step completion position.

During subsequent suck-back operation, the changeover valve 151 is placed in position B, and the changeover valves 152 and 155 are placed in position A. Further, the changeover valve 156 remains in position B, so that the open/close valve 153 remains in position A. As a result, the screw 12 is retreated in order to effect suck-back operation.

In a subsequent injection step, the changeover valves 151 and 152 are placed in position A. Further, the changeover valve 156 is placed in position A, so that the open/close valve 153 is placed in position B. As a result, the screw 12 is advanced. At this time, the changeover valve 155 is placed in position B.

Next, a second embodiment of the present invention will be described.

Figure 15:
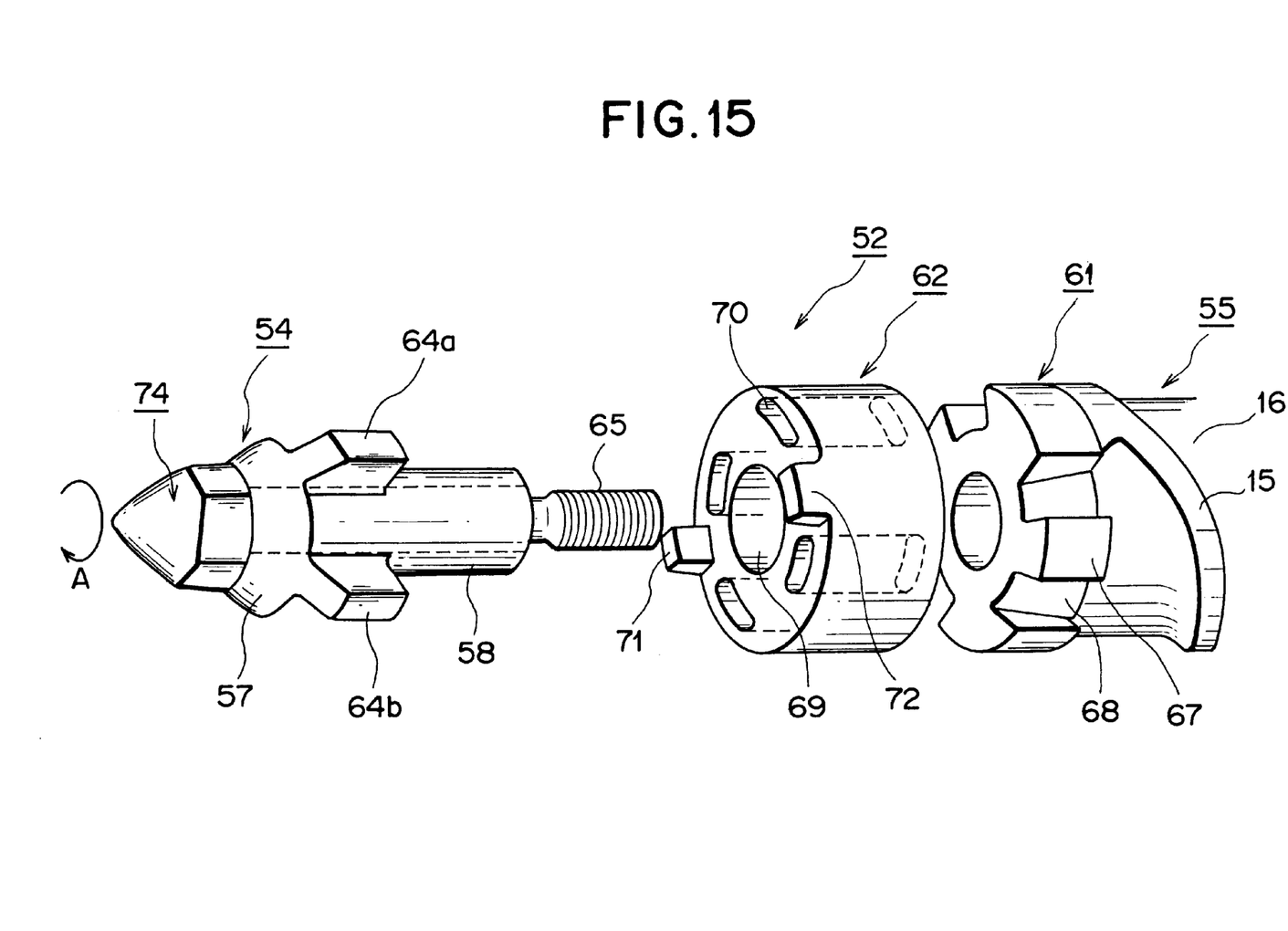
FIG. 15 is an exploded perspective view of a main portion of a screw according to a second embodiment of the present invention.

FIG. 15 is an exploded perspective view of a main portion of a screw according to a second embodiment of the present invention.

In FIG. 15, reference numeral 52 denotes a screw serving as an injection member. The screw 52 has a screw head 54 at the front side the left side in FIG. 15) and a metering portion 55 at the rear side (the right side in FIG. 15). A spiral flight 15 is formed on the surface of the metering portion 55, so that a groove 16 is formed along the flight 15.

The screw head 54 has a conical head body portion 57 formed at its front section (the left portion in FIG. 15) and a small-diameter portion 58 formed at its rear section (the right portion in FIG. 15). A plurality of pairs (two pairs in the present embodiment) of restriction projections 64a and 64b (only a single pair of restriction projections 64a and 64b is shown in FIG. 15) are formed at the front end of the small-diameter portion 58. A head bolt 74 penetrates the screw head 54. A threaded portion 65 formed at the rear end (the right end in FIG. 15) of the head bolt 74 is screwed into the metering portion 55 in order to fix the screw head 54 to the metering portion 55.

Further, an annular first ring 61 is fixed to the front end of the metering portion 55, and an annular second ring 62 is disposed to surround the small-diameter portion 58 and to be located adjacent to the first ring 61. The first ring may be formed integrally with the metering portion.

In order to prevent the second ring 62 from rotating together with the screw head 54, the thickness of the second ring 62 is rendered slightly smaller than the distance between the rear ends of the restriction projections 64a and 64b and the front end of the first ring 61 such that a clearance of about 0.1 to 0.2 mm is formed between the rear end of the second ring 62 and the front end of the first ring 61 or between the rear ends of the restriction projections 64a and 64b and the front end of the second ring 62. Notably, the second ring 62 does not move in the axial direction upon changeover between injection and metering.

In order to prevent the second ring 62 from rotating together with the screw head 54, the outside diameter of the second ring 62 is set slightly smaller than the inside diameter of an unillustrated heating cylinder which serves as a heating member, and the inside diameter of the second ring 62 is set slightly greater than the outside diameter of the small-diameter portion 58.

The first ring 61 has lands 67 formed on the outer surface at a plurality of circumferential positions and grooves 68 each formed between corresponding lands 67 and serving as a first resin passage.

The second ring 62 has a central opening 69, through which the small-diameter portion 58 passes. Further, the second ring 62 has through holes 70 formed at a plurality of circumferential positions corresponding to the positions of the grooves 68. The though holes 70 serve as a second resin passage. Further, engagement claws 71 and 72 project from the end surface of the second ring 62 facing the screw head 54 such that, the each of the engagement claws 71 and 72 is disposed between the restriction projections 64a and 64b.

Therefore, the first and second rings 61 and 62 are rotatable relative to each other, and their relative rotation is restricted by rotation restriction means, which is constituted by the engagement claws 71 and 72 and the restriction projections 64a and 64b.

When the screw 52 is rotated forward or in the direction of arrow A in the metering step, the first ring 61 is rotated in the same direction as the screw 52. Subsequently, the second ring 62 is rotated in the same direction as the screw 52, by means of frictional force generated between the second ring 62 and the first ring 61 and flow of resin generated upon rotation of the first ring 61.

In this case, with forward rotation of the screw 52, the first ring 61 is rotated first, so that relative rotation is produced between the first and second rings 51 and 62. However, when the restriction projections 64a come into contact with the engagement claws 71 and 72, the first and second rings 61 and 62 are rotated together.

As a result, each groove 68 and the corresponding through hole 70 are positioned at the same circumferential position so that they communicate each other. Therefore, upon the forward rotation of the screw 52, resin moves forward from the metering portion 55 via the grooves 68 and the through holes 70 and is accumulated in the space located forward of the screw head 54.

When the metering step has been completed in the above-described manner, after elapse of a delay time, a sealing operation is performed. That is, the screw 52 is rotated in the direction opposite the direction of arrow A at a rotational speed N (rpm) for a period t.

Consequently, the first ring 61 is rotated in the same direction as the screw 52. Subsequently, the second ring 62 is rotated in the same direction as the screw 52, by means of frictional force generated between the second ring 62 and the first ring 61 and flow of resin generated upon rotation of the first ring 61.

In this case, the first ring 61 is rotated first, so that a relative rotation is produced between the first and second rings 61 and 62. However, when the restriction projections 64b come into contact with the engagement claws 71 and 72, the first and second rings 61 and 62 are rotated together.

As a result, each groove 68 and the corresponding through hole 70 are positioned at different circumferential positions so that the communication between the grooves 68f and the through holes 70 is broken. Thus, sealing is effected.

Since the communication between the spaces located on the front and rear sides of the first and second rings 61 and 62, respectively, is established via the grooves 68 and the through holes 70 upon completion of the metering step, when the start of the sealing is delayed, the pressure of resin located on the front side of the first and second rings 61 and 62 and the pressure of resin located on the rear side of the first and second rings 61 and 62 are equalized, with the result that the pressure of resin in the space located forward of the screw head 54 decreases.

Accordingly, when the first ring 61 is rotated earlier, resin located forward of the screw head 54 is prevented from flowing in the reverse rotation direction upon rotation of the screw 52, with the result that the second ring 62 is not rotated simultaneously with the first ring 61. Thus, the communication between the grooves 68 and the through holes 70 is broken reliably in order to effect reliable sealing. Notably, as the delay time is increased, the pressure of resin located forward of the screw head 54 decreases and becomes stable.

Subsequently, suck-back is performed in order to decrease further the pressure of resin located forward of the screw head 54 to thereby prevent resin from running from the front end of an unillustrated injection nozzle. At this time, even when the screw 52 is retreated (roved to the right in FIG. 15), resin within the metering portion 55 does not move forward. Accordingly, variations in the amount of resin accumulated in the space located forward of the screw head 54 are prevented.

As a result, the amount of injected resin becomes constant, so that molded products do not suffer defects such as short shot and burrs.

When the screw 52 is rotated in reverse, the screw 52 is apt to advance due to a screw effect. In order to prevent this undesirable advancement, an unillustrated injection cylinder holds the screw 52 at a metering-step completion position within the heating cylinder.

Subsequently, when the screw 52 is advanced (moved to the left in FIG. 15) in the injection step, the resin accumulated in the space located forward of the screw head 54 is apt to flow in reverse or backward. However, the first and second rings 61 and 62 are in the same states as those during the suck-back operation, and sealing is established.

As a result, the resin accumulated in the space located forward of the screw head 54 is prevented from flowing in reverse, so that the amount of injected resin becomes constant, and molded products do not suffer defects such as short shot and burrs.

Moreover, in the injection step, resin can be fed into the cavity of an unillustrated mold apparatus simultaneously with commencement of advance movement of the screw 52. Therefore, the response in transmitting injection force to the melt front can be improved.

Furthermore, the timing of completion of the sealing operation does not vary with the state of kneading and dispersion of resin, resin viscosity, resin temperature, and the rate at which the screw speed is increased at the time of starting the injection step.

Next, a third embodiment of the present invention will be described. Portions having the same structures as those in the second embodiment will be denoted by the same reference numerals, and their repeated descriptions will be omitted.

Figure 16:
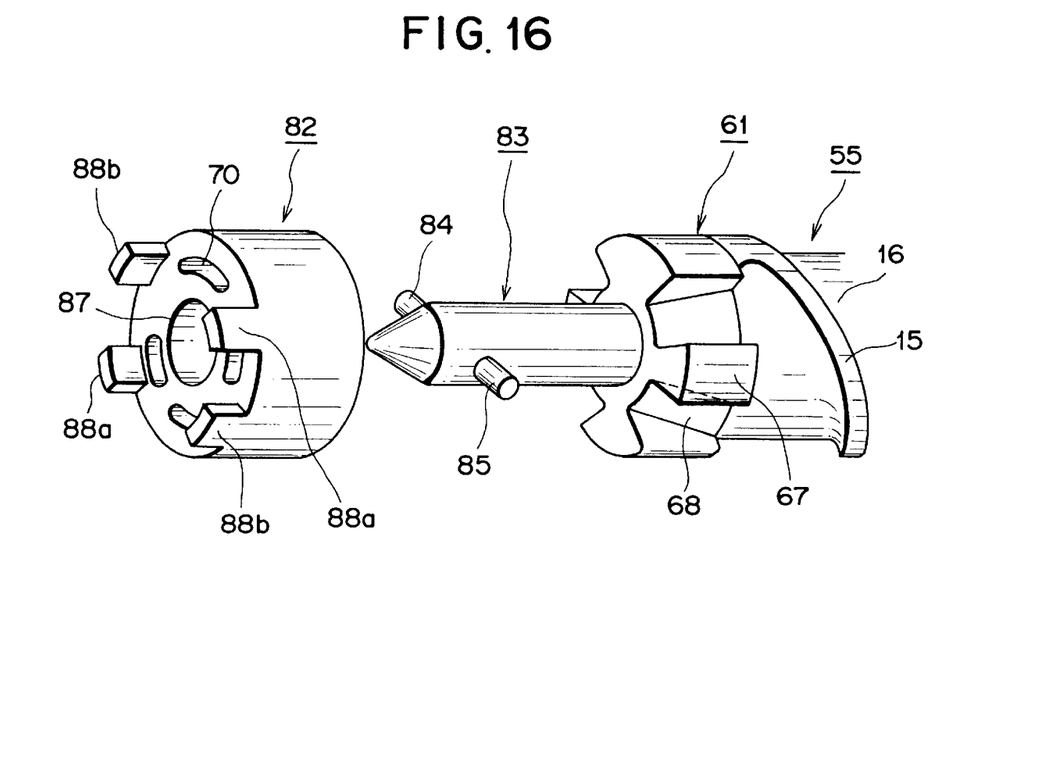
FIG. 16 is an exploded perspective view of a main portion of a screw according to a third embodiment of the present invention.

FIG. 16 is an exploded perspective view of a main portion of a screw according to the third embodiment of the present invention.

In the present embodiment, restriction pins 84 and 85 are formed at the front end (left-hand end in FIG. 16) of a screw head 83 such that the restriction pins 84 and 85 project radially outward. A second ring 82 has a central opening 87, through which the screw head 83 passes. Further, the second ring 82 has through holes 70 formed at a plurality of circumferential positions corresponding to the positions of the grooves 63 of the first ring 61. The grooves 68 serve as a first resin passage, and the though holes 70 serve as a second resin passage. The first ring 61 is fixed to the front end of the metering portion 55. Further, two pairs of engagement claws 88a and 88b project from the end surface of the second ring 82 facing toward the tip end of the screw head 83 such that the pairs of the engagement claws 88a and 88b correspond to the restriction pins 84 and 85, respectively. Therefore, the first and second rings 61 and 32 are rotatable relative to each other, and their relative rotation is restricted by rotation restriction means, which is constituted by the engagement claws 88a and 88b and the restriction pins 84 and 85.

In this case, since the restriction projections 64a and 64b (FIG. 15) are not required to be formed on the screw head 83, the structure of the back-flow prevention apparatus can be simplified.

Next, a fourth embodiment of the present invention will be described. Portions having the same structures as those in the first embodiment will be denoted by the same reference numerals, and their repeated descriptions will be omitted.

Figure 17:
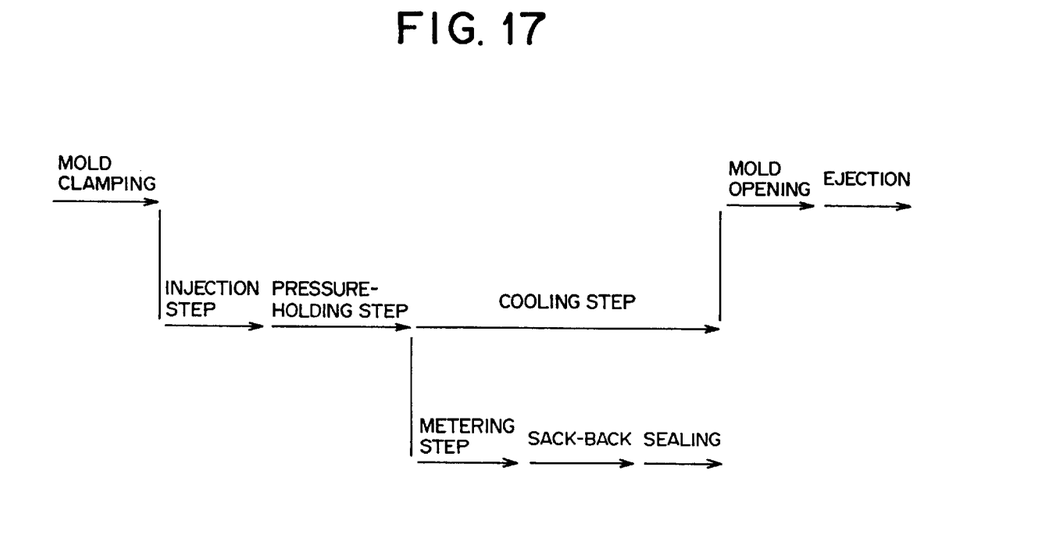
FIG. 17 is a time chart showing operation of a back-flow prevention apparatus according to a fourth embodiment of the present invention.

FIG. 17 is a time chart showing operation of a back-flow prevention apparatus according to the fourth embodiment of the present invention.

In the present embodiment, after completion of clamping performed by the mold clamping apparatus, an injection step is started, upon completion of which a pressure-holding step is performed for a predetermined period of time. In the mold apparatus, a cooling step is started, during which the injection apparatus performs metering, suck-back, and sealing. When the cooling step is ended in the mold apparatus, the mold clamping apparatus effects mold opening and ejection.

That is, after completion of the metering step, unillustrated suck-back control means of the controller 171 (FIG. 13) serving as resin-pressure reduction means drives the injection cylinder 141 (FIG. 12) in order to retreat the screw 12 (FIG. 2) over a predetermined distance without rotation, to thereby effect suck-back. Therefore, the pressure of resin located forward of the screw head 14 is decreased in order to prevent resin from running from the front end of the injection nozzle 13.

Subsequently, unillustrated sealing control means of the controller 171 drives the oil motor 148 in order to start the sealing.

At this time, since the pressure of resin in the space located forward of the screw head 14 has been decreased upon suck-back, when the first ring 31 is rotated earlier, resin located forward of the screw head 14 is prevented from flowing in the reverse rotation direction upon rotation of the screw 12, with the result that the second ring 32 is not rotated simultaneously with the first ring 31. Thus, the communication between the grooves 37 (FIG. 3) and the grooves 47 (FIG. 5) is broken reliably in order to effect reliable sealing.

In the present embodiment, the present invention is applied to the injection apparatus which has been described in the first embodiment. However, the present invention can be applied to the injection apparatuses which have been described in the second and third embodiments.

Next, a fifth embodiment of the present invention will be described. Portions having the same structures as those in the first embodiment will be denoted by the same reference numerals, and their repeated descriptions will be omitted.

Figure 18:
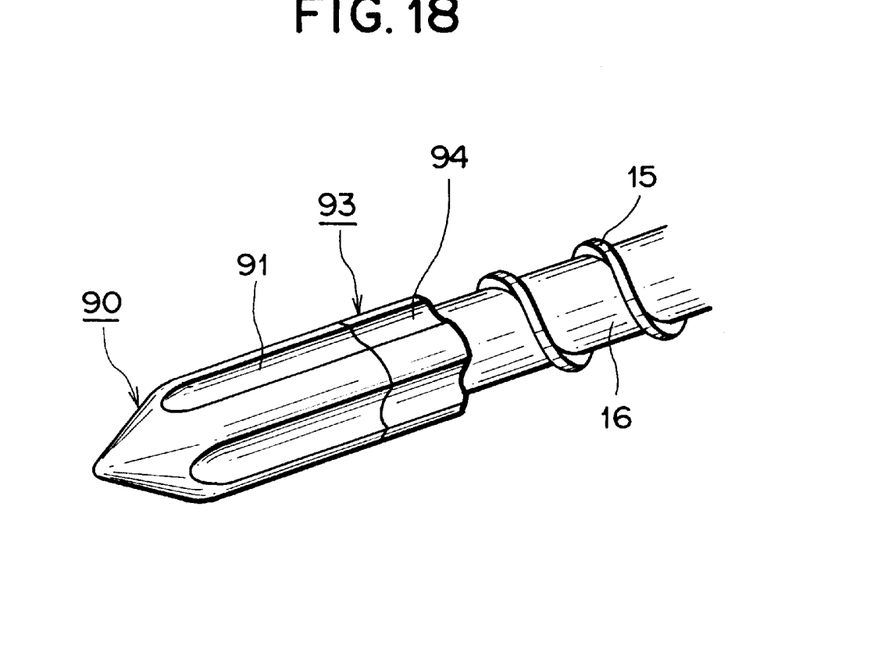
FIG. 18 is a perspective view of a main portion of a screw according to a fifth embodiment of the present invention.
Figure 19:
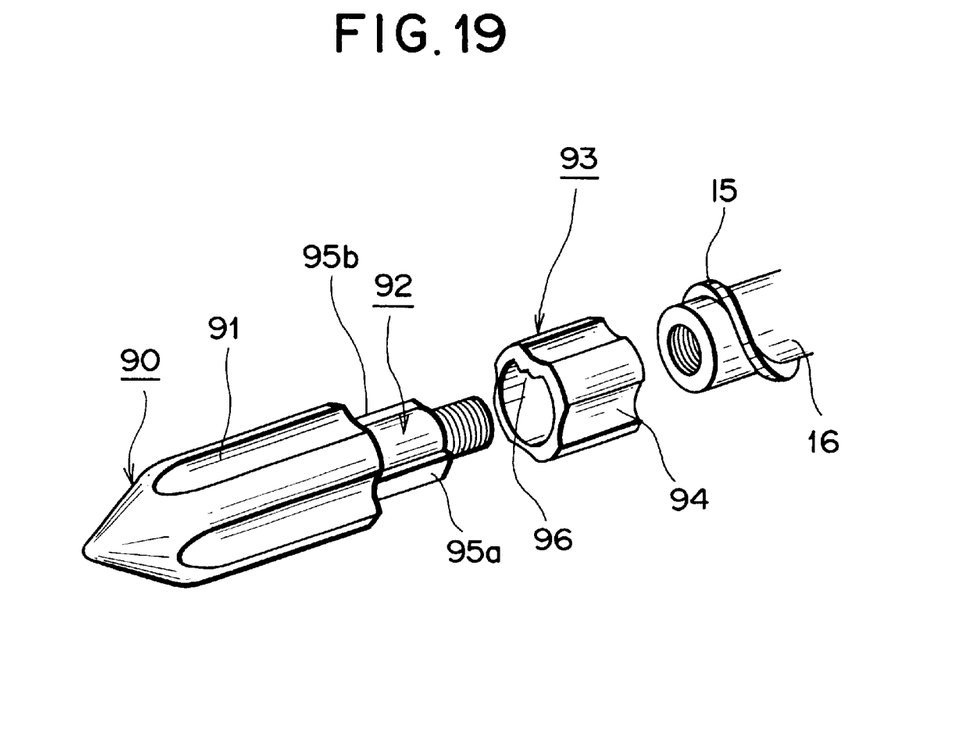
FIG. 19 is an exploded perspective view of a main portion of the screw according to the fifth embodiment of the present invention.

FIG. 18 is a perspective view of a main portion of a screw according to the fifth embodiment of the present invention; and FIG. 19 is an exploded perspective view of a main portion of the screw according to the fifth embodiment of the present invention.

In the-present embodiment, a rotatable ring 93 is disposed to surround a small-diameter portion 92 of a screw head 90. The ring 93 has a first resin passage 94 formed on the outer surface thereof at each of a plurality of circumferential locations, and the screw head 90 has a second resin passage 91 formed on the outer surface thereof at each of a plurality of circumferential locations. Further, engagement claws 95a and 95b are formed on the outer circumference of the small-diameter portion 92 at predetermined intervals. An engagement claw 96 is formed on the inner circumference surface of the ring 93 such that the engagement claw 96 is located between the engagement claws 95a and 95b. Therefore, the range of rotation of the ring 93 is restricted by rotation restriction means, which is constituted by the engagement claws 95a, 95b, and 96.

In this case, since disposition of only one ring 93 is required, the cost of the injection apparatus can be reduced.

The present invention is not limited to the above-described embodiments. Numerous modifications and variations of the present invention are possible in light of the spirit of the present invention, and they are not excluded from the scope of the present invention.

What is claimed is:

1. A method of operating an injection apparatus comprising the steps of:

(a) rotating a screw in one direction in a metering step so as to produce a relative rotation between first and second rings disposed between a screw body and a screw head to thereby establish communication between a first resin passage formed in the first ring and a second resin passage formed in the second ring;

(b) waiting passage of a preset delay time after completion of the metering step; and (c) rotating the screw in the opposite direction upon passage of the delay time so as to produce a relative rotation between the first and second rings to thereby break the communication between the first and second resin passages, thereby effecting sealing.

2. A method of operating an injection apparatus comprising the steps of:

(a) rotating a screw in one direction in a metering step so as to produce a relative rotation between the first and second rings disposed between a screw body and a screw head to thereby establish communication between a first resin passage formed in the first ring and a second resin passage formed in the second ring;

(b) performing suck-back after completion of the metering step; and (c) rotating the screw in the opposite direction upon completion of the suck-back so as to produce a relative rotation between the first and second rings to thereby break the communication between the first and second resin passages, thereby effecting sealing.

3. A method of operating an injection apparatus, said method comprising the steps of:

(a) rotating a screw in one direction in a metering step so as to establish communication between a metering portion and a space located forward of a screw head to thereby accumulate resin in the space located forward of the screw head;

(b) reducing pressure of the resin in the space located forward of the screw head after completion of the metering step; and (c) rotating the screw in an opposite direction after reducing the pressure of the resin so as to break the communication between the metering portion and the space located forward of the screw head to thereby effect sealing.

4. The method of operating an injection apparatus according to claim 3, wherein the pressure of the resin is reduced through waiting passage of a delay time after completion of the metering step.

5. The method of operating an injection apparatus according to claim 3, wherein the pressure of the resin is reduced through performance of suck-back after completion of the metering step.

6. The method of operating an injection apparatus according to claim 3, wherein communication between a first and second resin passage formed in a first and second ring respectively, which are disposed between a screw body and the screw head, is established when the screw is rotated in one direction, and communication between the first and second resin passages is broken when the screw is rotated in the opposite direction.

* * * * *